US009880894B2

(12) United States Patent
Wang et al.

(10) Patent No.: US 9,880,894 B2
(45) Date of Patent: Jan. 30, 2018

(54) HIGH AVAILABILITY AND ENERGY-EFFICIENT WATCHDOG TIMER

(71) Applicant: MICROSOFT TECHNOLOGY LICENSING, LLC, Redmond, WA (US)

(72) Inventors: Bin Wang, Bellevue, WA (US); Robert Yu Zhu, Bellevue, WA (US); Qipeng Wu, Kirkland, WA (US); Dejun Zhang, Redmond, WA (US); Pengxiang Zhao, Bellevue, WA (US); Ying N. Chin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 27 days.

(21) Appl. No.: 14/794,778

(22) Filed: Jul. 8, 2015

(65) Prior Publication Data

US 2017/0010933 A1 Jan. 12, 2017

(51) Int. Cl.
*G06F 11/07* (2006.01)
*G06F 1/32* (2006.01)

(52) U.S. Cl.
CPC ........ *G06F 11/0757* (2013.01); *G06F 1/3203* (2013.01); *G06F 11/0736* (2013.01)

(58) Field of Classification Search
CPC ............... G06F 11/008; G06F 11/0751; G06F 11/3058; G06F 11/0766; G06F 11/14;

(Continued)

(56) References Cited

U.S. PATENT DOCUMENTS 5,175,845 A * 12/1992 Little .................. G06F 1/24
713/321
5,513,319 A 4/1996 Finch et al.
(Continued)

FOREIGN PATENT DOCUMENTS

CN 101510165 A 8/2009
JP 2003300438 A 10/2003

OTHER PUBLICATIONS

"AVR132: Using the Enhanced Watchdog Timer", Published on: Feb. 11, 2014, 17 pages. Available at: http://www.atmel.com/images/doc2551.pdf.

(Continued)

*Primary Examiner* — Nadeem Iqbal

(57) ABSTRACT

Examples for an intelligent watchdog timer for a computing device are described herein. The watchdog timer operates a watchdog counter that repetitively counts a watchdog count interval from an initial value to a final value. The watchdog counter is continually reset if the device is functioning properly. If the watchdog timer is allowed to reach a final count value, a processor reset is initiated. Several components operate to detect the current mode of operation of the processor or an operating system, and predict, in part based on user context, when different power states may occur. The components also forecast when the watchdog timer is scheduled to reach the final count value. Based on the forecasts of when the watchdog timer will reach the final count value and the predictions of future power states of the processor or operating system, the watchdog counter is selectively disabled or reset.

20 Claims, 9 Drawing Sheets

(58) Field of Classification Search
CPC .... G06F 1/3262; G06F 1/3231; G06F 1/3265; G06F 1/24; G06F 1/26
See application file for complete search history.

(56) References Cited

U.S. PATENT DOCUMENTS

| | | | | |
|---|---|---|---|---|
| 5,903,766 | A * | 5/1999 | Walker | G06F 1/24 713/323 |
| 6,393,589 | B1 | 5/2002 | Smit et al. | |
| 6,505,298 | B1 | 1/2003 | Cerbini et al. | |
| 7,340,596 | B1 * | 3/2008 | Crosland | G06F 1/24 713/1 |
| 8,375,258 | B1 * | 2/2013 | Sheets | G06F 11/0721 714/55 |
| 8,645,729 | B2 * | 2/2014 | Simmons | G06F 1/325 713/300 |
| 8,977,911 | B1 * | 3/2015 | Sheets | G06F 11/0721 714/55 |
| 2002/0172097 | A1 * | 11/2002 | Freed | G06F 1/3203 368/108 |
| 2003/0204792 | A1 * | 10/2003 | Cahill | G06F 11/0757 714/55 |
| 2004/0025067 | A1 * | 2/2004 | Gary | G06F 8/4432 713/300 |
| 2010/0332902 | A1 | 12/2010 | Banginwar et al. | |

OTHER PUBLICATIONS

"WatchDog Timer", Published on: Mar. 25, 2015, 5 pages. Available at: https://developer.mbed.org/cookbook/WatchDog-Timer.

Ardiri, Aaron, "Watchdog Timers—How to Reduce Power Usage in Your Arduino Projects", Published on: Oct. 28, 2014, 3 pages. Available at: http://evothings.com/watchdog-timers-how-to-reduce-power-usage-in-your-arduino-projects/.

Dicola, Tony, "Example 2: Power-Down Sleep", Published on: Feb. 13, 2014, pp. 12-14. Available at: https://learn.adafruit.com/low-power-wifi-datalogging/power-down-sleep.

Cox, et al., "Watchdog(8)—Linux Man Page", Published on: Apr. 7, 2008, 7 pages. Available at: http://linux.die.net/man/8/watchdog.

"Watchdog Timer", Retrieved on: May 20, 2015, 3 pages. Available at: https://devzone.nordicsemi.com/guestion/818/watchdog-timer/.

Isozaki, et al., "Keeping High Availability of Connected End-point Devices in Smart Grid", In Proceedings of Fourth International Conference on Smart Grids, Green Communications and IT Energy-aware Technologies, Apr. 20, 2014, pp. 73-80.

"International Search Report and Written Opinion Issued in PCT Application No. PCT/US2016/038866", dated Sep. 19, 2016, 13 Pages.

"International Preliminary Report on Patentability Issued in PCT Application No. PCT/US2016/038866", dated Apr. 11, 2017, 9 Pages.

* cited by examiner

HIGH AVAILABILITY AND ENERGY-EFFICIENT WATCHDOG TIMER

BACKGROUND

A watchdog timer, also referred to as a computer operating properly (COP) timer, is a counter used to detect and recover a malfunctioning computing device. Generally, a watchdog timer uses a counter that counts down from an initial value to zero, or some end count value. If the watchdog timer reaches the end count value, a device reset is performed by sending a reset signal restarting the processor and the embedded software it is running. When a device is functioning properly, software resets the watchdog timer to delay the system reset function. When the device is malfunctioning, the resetting software never gets executed and the watchdog counter reaches final count value, resulting in the device being reset. Put another way, the watchdog timer acts as a continually running counter, which, if allowed to count down to zero, issues a device or processor reset.

Watchdog timers are commonly found in embedded systems and other computer-controlled equipment where humans cannot easily access the equipment or would be unable to react to faults in a timely manner. Such systems and computing devices cannot depend on a human to reboot when they get hung up. So the systems must be self reliant and able to quickly recognize when system lock ups occur. The watchdog timer provides an easy mechanism for both.

The act of restarting a watchdog timer is commonly performed by writing to a watchdog control port. Alternatively, some microcontrollers have an integrated watchdog timer that resets the watchdog timer by executing a special machine-language instruction. One example of such machine-language instructions is the commonly used "CLR-WDT" (clear watchdog timer) command found in the instruction set of some microcontrollers manufactured by Microchip Technology, Inc., headquartered in Chandler, Ariz. in the United States of America.

SUMMARY

Some examples of the disclosure involve a computing device with an intelligently managed watchdog timer. The watchdog timer is configured to count a watchdog count interval from an initial time to an expiration time. A processor executing an operating system is programmed to detect a current mode of operation for the operating system. The processor also determines, based on the mode of operation, when the operating system or processor are scheduled to function in different power-consuming states. For scheduled timeframes when the operating system or processor are predicted to function in low power-consuming states, the watchdog timer and any hardware resets scheduled at expiration times during such low power-consuming states are disabled.

Other examples involve the selective operation of a watchdog timer based on the different power states of a computing device. A current mode of operation of the computing device is detected to determine when the device functions in a high power-consuming state and a low power-consuming state. Expiration times for the watchdog timer are determined and compared to the timeframes of the computing devices different power states. The expiration times scheduled to occur when the computing device is in a low power-consuming state are disabled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present disclosure is described in detail below with reference to the following accompanying drawings.

Corresponding reference characters indicate corresponding parts throughout the drawings.

DETAILED DESCRIPTION

Figure 1A:
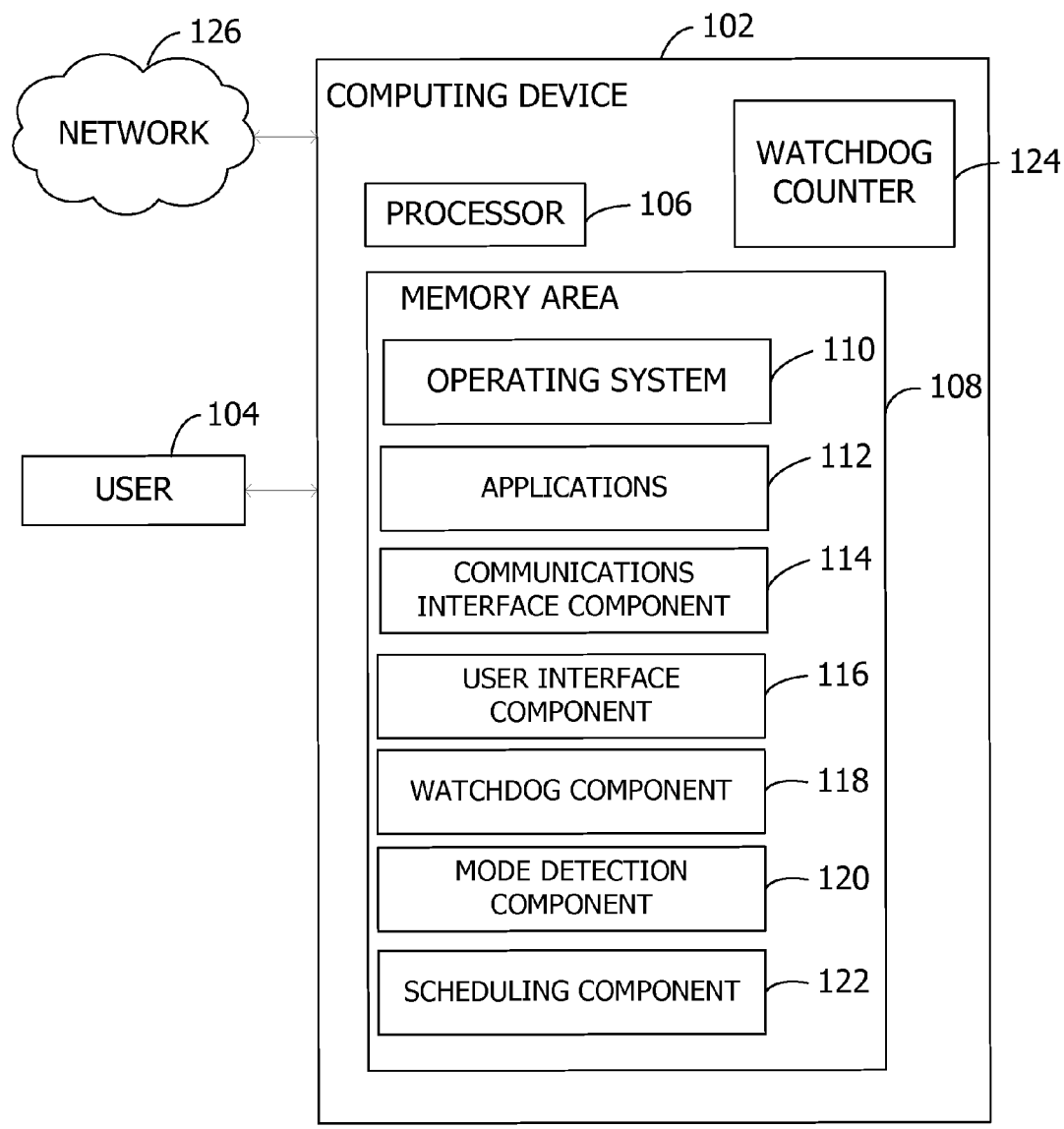
FIG. 1A is a block diagram of an operating environment for managing a watchdog timer.

This disclosure generally describes various examples for implementing a power-efficient watchdog timer that proactively predicts the power state of a monitored device based on its current or future mode of operation. The disclosed watchdog timer either allows a device reset to occur or disables the reset based on the predicted power state at the time a watchdog counter, which repeatedly counts from an initial count value to a final count value, is set to expire. The watchdog timer resets the counter back to the initial value if the monitored processor is functioning properly. Alternatively, if the processor or embedded system is hung up, the counter is allowed to reach the final count value, causing a processor to be initiated.

For purposes of this disclosure and to aid in the understanding of the various examples discussed herein, a "watchdog timer" includes a counter (the "watchdog counter") and executable instructions for managing the watchdog counter (the "watchdog component"). Both are discussed in more detail below, but it should at least be noted that mention of a watchdog timer herein refers to both the watchdog counter and the watchdog component.

Also, the watchdog timer's counter is referenced as beginning at an "initial value," referring to a beginning counter value; counting a "watchdog count interval," referring to a sequence of count numbers; and counting to a "final value," referring to an ending count value. For example, the initial value may be 256 (albeit stored in binary, hexadecimal, or the like); the final value may be 0, or some other number; and the watchdog count interval is then 256, for 256 values to count.

Additionally, to better understand the examples herein, the watchdog counter is referred to as counting from the initial value at an "initial time" down to the final value at an "expiration time." Continuing with the above example, the watchdog timer's counter may be configured to count from 256 at the initial time down to 0 at the expiration time, and this process is repeated over and over again in different cycles of the count interval.

The counter of the watchdog timer is reset back to the initial value if everything is functioning properly with the monitored processor. If not, however, the counter eventually reaches the final value. Whether reset or after having reached the final value, in one example, the watchdog timer operates on a continual loop, continually counting down from the initial value over and over. Alternatively, the counter may be configured to only begin counting upon instruction from other components of the watchdog timer. In this alternative configuration, the counter is allowed to count to the final value or be reset, and then the counter awaits instruction from the watchdog timer before beginning counting again from the initial value.

The watchdog timer does not always issue a processor reset when the counter reaches the final count value. In many instances, the reset may not be necessary because the monitored processor or embedded system is in an inactive (e.g., sleep, idle, or "off") state due to the current mode of operation of the operating system, processor, or computer device. For example, if the device is playing an audio file, the OS may be configured to repeatedly process the audio file for 4 ms and then shut off (e.g., be in active) for 10 ms: 4 ms processing, 10 ms off, 4 ms processing, 10 ms off, and so forth. At least one example predicts when the OS is going to be in the sleep mode based on the current mode of operation of the device, forecasts when the watchdog timer will run down to its final value, and determines whether the expiration time of the watchdog timer is scheduled to occur at a future time when the operating system is in an inactive state. If so, the watchdog timer will be disabled, either immediately or before the operating system goes inactive. This enables the watchdog timer to only follow through on scheduled processor resets when the operating system is active and hung. Resets are not necessary when the operating system is inactive.

This disclosure describes an operating system being in the active or inactive state and respectively being in a high power-consuming or low power-consuming power state. These power-consuming states refer to the amount power being used by a processor to execute various tasks of the operating system. For example, the processor uses more power during the aforesaid 4 ms active periods than during the 10 ms inactive periods of the operating system. Thus, the power state of the operating system dictates the power state of the processor. For the sake of clarity, reference is made throughout to differing power states based on the activity or inactivity of the operating system, but some examples apply the same techniques and components discussed herein based on the activity or inactivity of the processor specifically, regardless of the operating system's state. For instance, the processor may take the form of a graphics processing unit (GPU) that draws little to no power when a rendering program is not being used, even in times when the operating system is working diligently on other functions. For purposes of this disclosure and the appended claims, the components making decisions, and the decisions themselves, based on the power state of the operating system may equally be applied to the power state of the processor. Thus, "operating system" and "processor" may be used interchangeably herein when referring to mode detection, scheduling of power-state timeframes, and hardware resets.

Selectively disabling the watchdog timer to only issue reset when the operating system is awake enables the device to save a considerable amount of power without hindering the watchdog timer's ability to clear hang ups. Various examples disclosed herein use a hardware-based watchdog timer that consumes power as it operates. Because resets do not need to occur when the OS is asleep, shutting off the hardware-based watchdog timer while the OS is asleep drastically reduces the power consumed by the timer. The examples disclosed herein also conserve memory and reduce processor loads because the watchdog is periodically disabled, thereby freeing up the memory and processor to perform other tasks.

Additionally, the selective watchdog timer ensures that devices are not needlessly reset, which may be very frustrating to end users. For example, a smart phone that continually restarts itself may annoy users or, even worse, not be available to users during emergency situations. The same frustration of devices needlessly rebooting may be experienced in virtually any other computing environment.

Examples described herein involve computer code or machine-useable instructions, including computer-executable instructions such as program components, being executed by a computing device or other machine, e.g., smart phone, tablet, server, gaming console, control system, or the like. Generally, program components include routines, subroutines, programs, objects, components, application programming interfaces (APIs), data structures, and the like that refer to code performing particular tasks or implementing particular abstract data types.

Having briefly described an overview of different examples, exemplary operating environments suitable for implementing the disclosed watched timers are described below. With reference to the accompanying drawings, FIGS. 1A-1C are block diagrams of different configurations for a computing device 102 with a watchdog timer that selectively disables and enables scheduled processor resets, according to various examples.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1B:
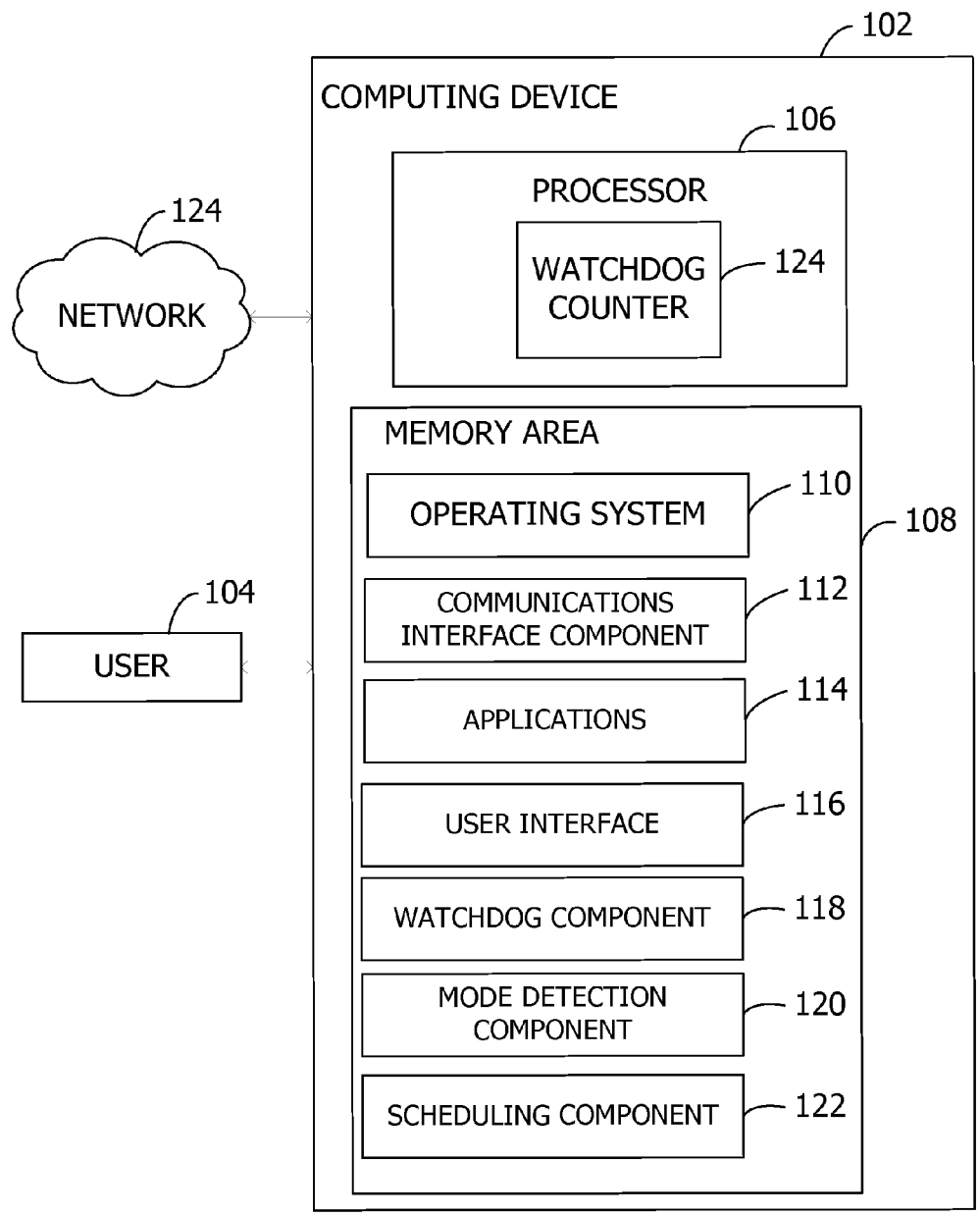
FIG. 1B is a block diagram of an operating environment for managing a watchdog timer.
Figure 1C:
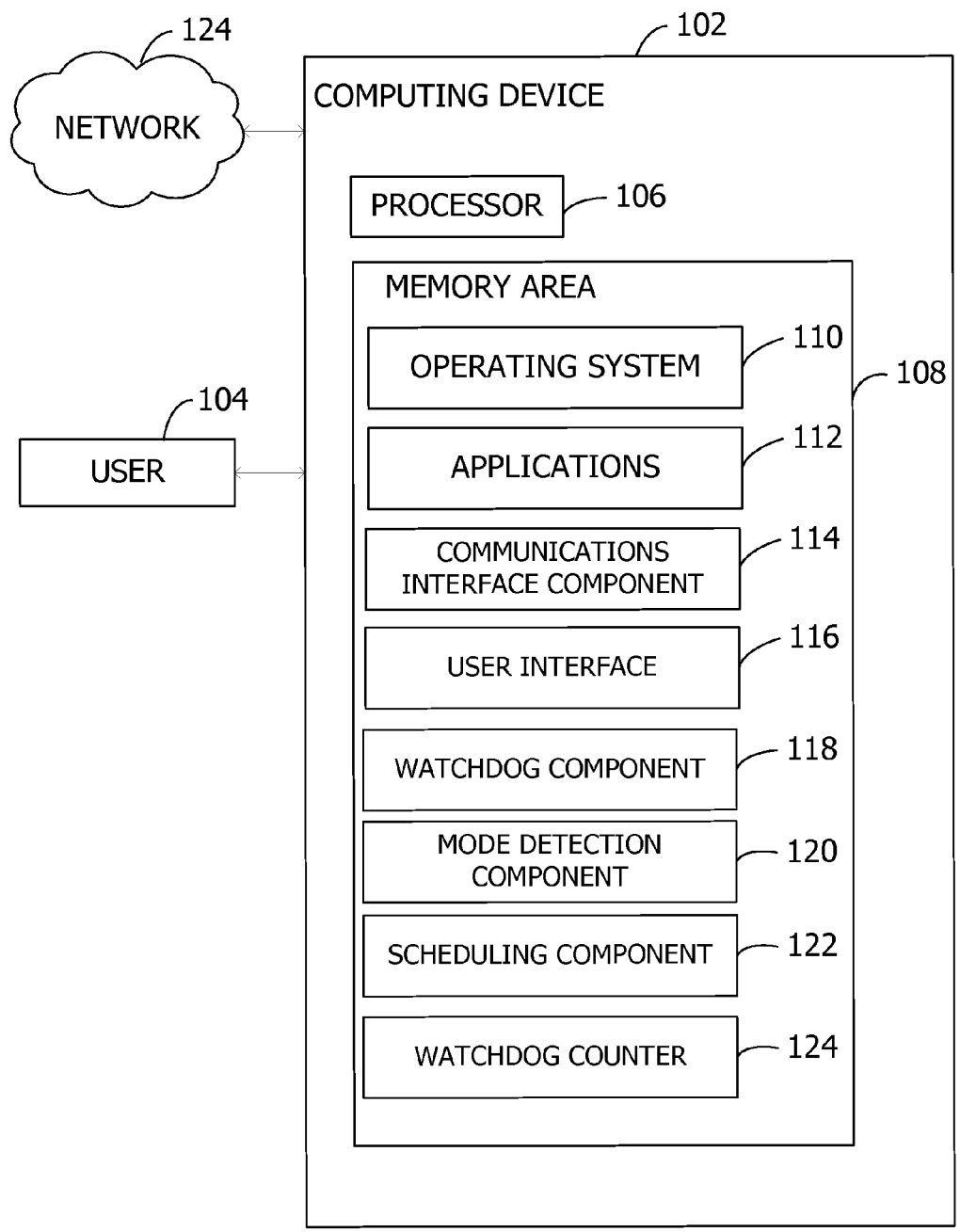
FIG. 1C is a block diagram of an operating environment for managing a watchdog timer.

In FIG. 1A, the computing device 102 is accessible by a user 104 and represents a system for implementing a selective watchdog timer comprising a watchdog component 118 and a watchdog counter 124. The computing device 102 includes a processor 106, the watchdog timer 124, and a memory area 108. The memory area 108 stores instructions and device-specific drivers that include operating system 110, applications 112, communications interface component 114, user interface component 116, watchdog component 118, mode detection component 120, and scheduling component 122. These instructions, when processed by the processor 106, implement various operations and functionality associated with the computing device 102.

The computing device 102 may take the form of a mobile computing device or any other portable device. In some examples, the computing device 102 may be a mobile phone, laptop, tablet, computing pad, netbook, gaming device, and/or portable media player. The computing device 102 may also include less portable devices such as desktop personal computers, kiosks, tabletop devices, industrial control devices, wireless charging stations, gaming consoles, servers, electric automobile charging stations, control systems, and the like. Additionally, the computing device 102 may represent a group of processors or other computing devices 102. The computing device 102 is but one example of a suitable computing environment and is not intended to suggest any limitation as to the scope of use or functionality of the disclosed examples. Neither should the computing device 102 be interpreted as having any dependency or requirement relating to any one or combination of components illustrated.

The processor 106 may include any quantity of processing units, and is programmed to execute computer-executable instructions for implementing aspects of the disclosure. The instructions may be performed by the processor 106 or by multiple processors within the computing device, or performed by a processor external to the computing device. In some examples, the processor 106 is programmed to execute instructions to perform the actions specified in FIGS. 3-5. Moreover, in some examples, the processor 106 represents an implementation of analog techniques to perform the operations described herein. For example, the operations may be performed by an analog computing device and/or a digital computing device.

The memory area 108 includes any quantity of computer-storage media associated with or accessible by the computing device 102. The memory area may be internal to the computing device 102 (as shown in FIGS. 1A-1C), external to the computing device (not shown), or both (not shown). Examples of memory stored in the memory area 108 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and be accessed by the computing device 102. Such memory may take the form of volatile and/or nonvolatile memory; may be removable, non-removable, or a combination thereof; and may include various hardware devices (e.g., solid-state memory, hard drives, optical-disc drives, etc.). For the purposes of this disclosure, however, "computer storage media" does not include carrier waves or propagating signaling.

The memory area 108 may be configured to store initial times and expiration times of the watchdog counter 124 counting a watchdog count interval. For example, the memory area 108 may store the timestamp of when counting began and a predicted expiration time for when counting should reach a final value. Alternatively, the memory area 108 may be configured to store data that indicates either the initial times or expiration times, but not the actual times themselves, of the watchdog counter 124 as it counts a watchdog count interval. Such data may include the initial time, the expiration time, the initial value, the final value, a current count value, a predicted count value, or any other parameter for running the watchdog timers discussed herein.

In one example, the memory area 108 stores the initial time that the watchdog counter 124 started counting and a current count value, and the two may be used to determine the expiration time. In such an example, the expiration time may not actually be stored, but may instead be calculated based on the stored initial time and current count value.

In an alternative example, the watchdog count interval (e.g., 150), the current count value (e.g., 75), and the time of the most recent count are stored in memory area 108. The expiration time may then be determined based on these three by estimating the amount of time required to count the rest of the watchdog count interval.

The operating system 110, when executed by the processor 106, controls various aspects of the computing device 102. Particular to the examples discussed herein, the operating system 110 may be configured to function in various modes of operation, such as, for example but without limitation, an audio playback mode, a video playback mode, a video record mode, a video-conference mode, a connected standby mode, a camera mode, a web browser mode, a typing mode, or some other mode. The operating system 110 may be active (or "awake") during a portion of each mode and inactive (or "asleep") during another portion of each mode.

When active, the operating system 110 functions in a "high power-consuming state," meaning that the operating system 110 requires a relatively high amount of power to perform a set of functions when compared to the operating system 110 functioning in the inactive mode. Relatively high refers, in one example, to just being greater than the low power-consuming state. In other examples, "relatively high" means greater by a particular factor (e.g., two times, three times, etc.); a specific percentage (e.g., 10%, 15%, 30%, 50%, etc.); or a certain threshold (e.g., more than 2 mW, 5 W, etc.). When inactive, the operating system 110 functions in a "low power-consuming state," meaning that the operating system 110 consumes less power than when operating in the active mode. Thus, the high power-consuming state is only "high" when compared to the low power-consuming state, and vice versa. Examples are discussed herein in relation to just two different power states (the high and low power-consuming states) for the sake of clarity, but alternative operating systems 110 may operate in three, four, five, or more different power states.

Applications 112 are stored in the memory area 108. The applications 112, when executed by the processor 106, operate to perform functionality on the computing device 102. Exemplary applications 106 include mail application programs, web browsers, calendar application programs, gaming programs, address book application programs, messaging programs, media applications, location-based services, search programs, and the like. The applications 112 may communicate with counterpart applications or services such as web services accessible via a network 126. For example, the applications 112 may represent downloaded client-side applications that correspond to server-side services executing in a cloud and accessible over a network 126.

The network 126 may include any telecommunication or computer network. Examples of computer networks configurable to operate as the network 126 include, without limitation, a wireless network, landline, cable line, fiber-optic line, local area network (LAN), wide area network (WAN), or the like. The network may also comprise subsystems that transfer data between servers or computing devices. For example, network 126 may also include a point-to-point connection, the Internet, an Ethernet, a backplane bus, an electrical bus, a neural network, or other internal system.

In some examples, the communications interface component 114 includes a network interface card and/or computer-executable instructions (e.g., a driver) for operating a network interface card that provides access to the network 126. Communication between the computing device 102 and other devices over the network 126 may occur using any protocol or mechanism over any wired or wireless connection. In some examples, the communications interface is operable with short-range communication technologies such as by using near-field communication (NFC) tags, BLUETOOTH brand communications tags, or the like. Examples of network transfer protocols include, for example but without limitation, the hypertext transfer protocol (HTTP), file transfer protocol (FTP), simple object access protocol (SOAP), or the like. Requests and responses may be passed as different markup language messages—e.g., extensible markup language (XML), hypertext markup language (HTML), or the like—or as parameters for scripting languages. One skilled in the art will appreciate that numerous scripting languages may be used by different distributed applications, a list of which, while not exhaustive, includes JAVASCRIPT brand scripts, personal home page (PHP), or the like. Examples are not limited to any particular communication protocol, message language, or scripting language, as one skilled in the art will appreciate that different languages and protocols may be used to interact with distributed applications.

In some examples, the user interface component 116 includes a graphics card for displaying data to the user and receiving data from the user. The user interface component 116 may also include computer-executable instructions (e.g., a driver) for operating the graphics card. Further, the user interface component 116 may include a display (e.g., a touch screen display or natural user interface) and/or computer-executable instructions (e.g., a driver) for operating the display. The user interface component 116 may also include one or more of the following to provide data to the user or receive data from the user: speakers, a sound card, a camera, a microphone, a vibration motor, one or more accelerometers, joysticks, scanners, printers, a BLUETOOTH brand communication module, global positioning system (GPS) hardware, and a photoreceptive light sensor. For example, the user may input commands or manipulate data by moving the computing device 102 in a particular way.

The memory area 108 also stores one or more computer-executable components. As shown in each of FIGS. 1A-1C, example components include the watchdog component 118, the mode detection component 120, and the scheduling component 122 that are executable by the processor 106. These components 118-122 may be implemented solely through software, firmware, or a combination of the two. Alternatively, in some examples, any of these components 118-122 may be executed remotely by a server or other computing device 102 in communication over the network 126. For the sake of clarity, however, this disclosure focuses on components 118-122 being executed locally on the computing device 102, but alternative examples may remotely execute the watchdog component 118, the mode detection component 120, or the scheduling component 122.

The watchdog timer of the computing device 102 includes the watchdog counter 124 and the watchdog component 118. In the example illustrated in FIG. 1A, the watchdog counter 124 uses one or more one or more standalone hardware counters. Many processors have their own dedicated hardware counters, so some examples may use the hardware counters on the processor 106 as the watchdog counter 124, as shown in FIG. 1B. Additionally, other examples do not use a hardware counter, and instead implement the watchdog counter 124 in software, as shown by the watchdog counter 124 in FIG. 1C being stored in the memory area 108.

The watchdog component 118 starts and stops counting of the watchdog counter 124 and selectively issues hardware resets of the processor 106 using an output interface request. Hardware resets to the processor 106 are executed by the watchdog component 118 signaling the issuance of an output interface call. Such a call causes an enabling voltage signal (e.g., +5 mV) to be supplied to the reset pin of the processor 106.

Additionally or alternatively, the watchdog component 118 also selectively resets the watchdog counter 124. In one example, the watchdog component 118 begins the watchdog counter 124 counting the watchdog count interval from the initial value to the final value. This counting is performed at an initial time (for the initial value) to an expiration time (for the final value). The watchdog counter 124 is either allowed to reach the final value, causing the watchdog component 118 to issue a hardware reset signal to the processor 106. Or the watchdog counter 124 is reset during before the watchdog counter 124 reaches the final value, causing the watchdog counter 124 to begin counting again at the initial value.

For each cycle of the watchdog time interval, the watchdog component 118 performs several functions either beforehand; in parallel but before a certain threshold count value is reached (e.g., at count 100, halfway, at 90% of count interval); or during a previous counter interval cycle (e.g., one cycle ahead). For each count cycle (e.g., count from initial value to final value), the cycle's current initial time of counting and a forecasted expiration time for when the watchdog counter 124 is predicted to reach the final value are both stored in stored in memory of the memory area 108. These values may be kept for the current cycle only and discarded upon occurrence of a processor 106 reset, watchdog counter 124 reset, and/or an operating system 110 sleep.

The mode detection component 122, when executed, causes the processor 106 to detect a current mode of operation of the operating system 110 (in one example), the processor 106 (in another example), another processing unit such as a graphics processing (in another example), or the computing device 102 in general (in another example). The mode detection component 122 may be set to periodically detect (e.g., once every 5 seconds, 10 seconds, 4 minutes, etc.) the mode of operation of any of these devices. Alternatively, the mode detection component 122 may be configured to detect the mode of operation upon a specific event. Examples of such events include, without limitation, the expiration of a threshold time period before the operating system 110 going to sleep or waking, reset of the processor 106 or computing device 102, expiration of the watchdog counter 124, reset of the watchdog timer 124, initiation of a countdown of the watchdog counter 124, a change in mode of operation (e.g., from video record to audio playback).

The mode of operation indicates the context in which the user is using the computing device 102. For example, an audio playback mode may indicate the user is listening to audio. The video playback mode may indicate the user is listening to a video. The video record mode may indicate the user is recording a video. The connected standby mode may indicate the user is not actively using the computing device 102. The camera mode may indicate the user is taking a picture. The web browser mode may indicate the user is accessing the Internet. The typing mode may indicate the user is composing a textual message. Other modes of operation may indicate alternative or additional user contexts.

Alternatively or additionally, user context may be determined based on various operational states in the different modes of operation. For example, when the mode of operation is in an audio playback, the user context may be different when an audio file is being played, is paused for an extended amount of time than, or is stopped. Playing and pausing the audio file may be active user contexts; and stopping the audio file may be an inactive user context. Decisions for enabling or disabling a watchdog timer or issuing hardware resets may be based on the activity level associated with the various user contexts, or based on the actual user contexts themselves.

The scheduling component 122, when executed, causes the processor 106 to determine when the current mode of operation detected by the mode detection component 120 indicates the processor 106 functions in different power states (e.g., low power-consuming state and high power-consuming state). To do so, the scheduling component 122 accesses the operating system 110 work schedule (e.g., when the operating system 110 will be active and inactive) for the current mode of operation and prospectively determines future timeframes in which the operating system 110 will then be functioning in an active and inactive state power states.

For example, if the mode of operation is the audio playback mode, the operating system 110 operates in an active state for 4 ms, and inactive state for 10 ms, an active state for 4 ms, an inactive state for 10 ms, and so on until the mode of operation changes. As such, the operating system 110 is shut down every 4 ms, and thus consuming much less power during those inactive times. The scheduling component 122 accesses the audio playback work schedule for the operating system 110 from memory in the memory area 108, and accordingly projects future timeframes when the operating system 110 will be functioning in high power-consuming and low power-consuming power states. Such timeframes are illustrated in FIG. 2 and discussed further below.

The watchdog component 118 analyzes the projected timeframes frames of high and low power consumption for the operating system 110 and predicts whether the current count cycle of the watchdog counter 124 is set to reach the final value during a high or low power-consuming timeframe of the operating system 110. In other words, the watchdog component 118 forecasts the expiration time of the watchdog counter 124 and determines whether the expiration time is set to occur when the operating system 110 is projected to be in the active or inactive state. If in the active, high power-consuming power state, the watchdog component 118, in one example, allows the watchdog counter 124 to function normally. That is, if the watchdog counter 124 reaches the final value signal, in one example, a hardware reset of the processor 106 is initiated. If in the inactive, low power-consuming power state the watchdog component 118, in one example, proactively disables the processor 106 reset before the final value is ever be reached. In one example, this disablement of the processor 106 reset occurs while the operating system 110 is in the active, high power-consuming state to avoid the need to later wake up the operating system from an inactive power state. Using these procedures, the watchdog component 118, when executed, causes the processor 106 to selectively disable the watchdog timer based on what power state the processor 106 is scheduled to be in at the expiration time.

Alternatively or additionally, the watchdog component 118 may base the decision to disable the watchdog timer or issue a hardware reset on the determined user context. Some user contexts may dictate that the watchdog component 118 not disable during watchdog timer during certain low power-consuming states when an active user context is detected. For example, when the device is operating in a standby mode because an audio playback mode of operation has been timed out (e.g., the user paused an audio file for too long), the operating system 110 may be in an active power state even though the current mode of operation is in a standby mode. One example configuration treats the active user contexts as active, high power-consuming power states, and thus does not disable watchdog counter 124 disablements or hardware resets during these times. For the sake of clarity, the examples are discussed herein basing watchdog timer disablements and hardware resets on power states; however, active and inactive user contexts may be substituted for the active and inactive power states to trigger watchdog timer disablements and hardware resets.

In other examples, the watchdog timer may be disabled when a certain pattern, percentage, or threshold of expiration times are scheduled during low power-consuming states, or when a certain pattern, percentage, or threshold of prior hardware resets have been disabled. For example, some examples may prioritize the effectiveness of the watchdog timer's ability to clear hang-ups over power savings. Such examples may only disable the watchdog timer every other time (e.g., 50% of the time) that an expiration time is scheduled during a low power-consuming state, only disable the watchdog timer a certain number of times within set time period (e.g., an hour, day, week, etc.), or only disable the watchdog timer 10, 20, or so times in a given period.

Disabling hardware resets that are scheduled to occur when the operating system 110 is inactive saves considerable power-consuming resources because hardware resets require output interface calls and provision of appropriate voltage signaling to the reset pin of the processor 106. Because the operating system 110 is already in the off state, the hardware reset is not necessary, which effectively allows the watchdog timer to be used only during times when resets matter.

Figure 2A:
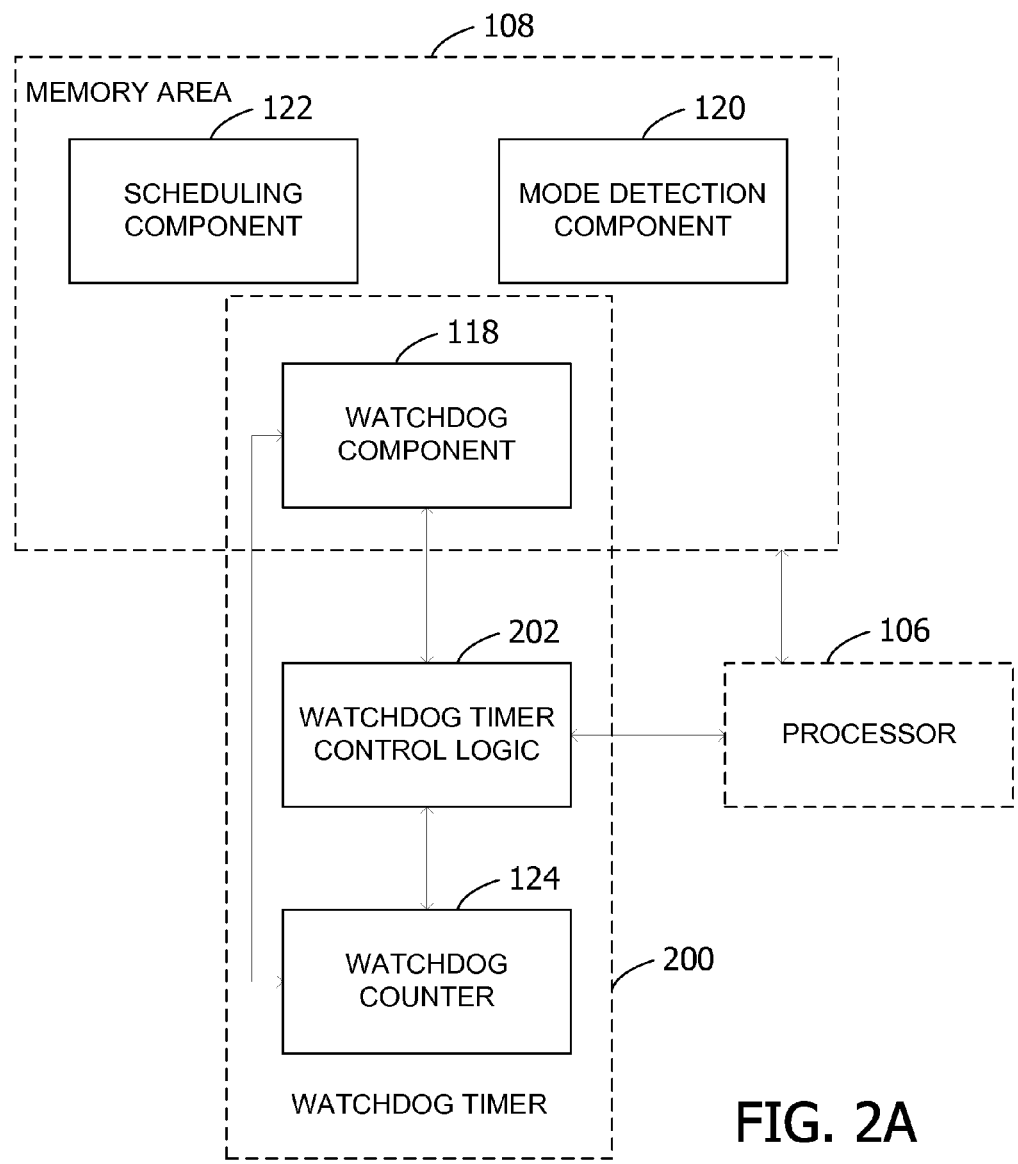
FIG. 2A is a block diagram of components for managing a watchdog timer.

FIG. 2A is a block diagram of different components of a watchdog timer 200 that selectively disables resets of processor 106 depending on the power state of the operating system 110 at the expiration time of the watchdog counter 124. As shown, the scheduling component 122, the mode detection component 120, and the watchdog component 118 are stored as instructions in the memory area 108 for execution by the processor 106. The mode detection component 120, when executed, detects the current mode of operation of the operating system 110. The scheduling component 122, when executed, forecasts timeframes for when the operating system 110 will be in different power states (e.g., high and low power-consuming states) based on the detected mode of operation.

In the illustrated example, the watchdog timer 200 includes the watchdog component 118, watchdog timer control logic 202, and the watchdog timer 124. In alternative examples, the watchdog timer 200 may include just the watchdog component 118 and the watchdog counter 124, without the watchdog timer control logic 202.

In one example, the watchdog component 118, when executed, predicts when the expiration times (e.g., when the counter will reach the final count value) will occur for the watchdog counter 124. The watchdog component 118 also determines whether any of the predicted expiration times of the watchdog counter 124 will occur while the operating system 110 functions in a low power-consuming state. For example, continuing with the audio playback example above, the watchdog component 118 determines whether the watchdog counter 124 will reach a final count value during any of the upcoming 10ms inactive timeframes of the operating system 110.

When the watchdog component 118 predicts that future expiration times is to occur during timeframes of the high power-consumption, the watchdog component 118 allows the processor 106 reset to occur. This hardware reset of processing 106 may occur, in one example, by the watchdog component 118 issues a hardware reset signal to watchdog timer control logic 202 at the expiration time of the watchdog counter 124. The watchdog timer control logic 202 represents one or more hardware output interfaces or circuitry capable of issuing a reset voltage or current signal to a reset pin on the processor 106. Upon receipt of the hardware reset signal, the watchdog timer control logic 202 generates and provides the reset pin of the processor 106 with the reset voltage or current signal.

Additionally, the watchdog component 118, in one example, is configured to reset the watchdog counter 124. As discussed above, the watchdog counter 124 is implemented in hardware in some examples and software in other examples. Specifically, when implemented in software, the watchdog counter 124 may be reset by the watchdog component 118 through software instructions, e.g., resetting a counter variable back to the initial value. For hardware-based counters, the watchdog timer 118 directs the watchdog timer control logic 202 to issue a reset of the hardware watchdog counter 124.

Examples are not limited to just detecting whether the watchdog counter 124 will reach a final count value during inactive periods during only a single mode of operation. In an alternative example, the mode detection component 120 and the scheduling component 122 respectively detect upcoming modes of operation for the operating system 110 (e.g., currently in video record mode but will switch to connected standby mode) and forecast timeframes of the active and inactive power states of the operating system 110 in the new mode of operation (e.g., active and inactive timeframes in the connected standby). The watchdog component 118 then predicts whether any expiration times of the watchdog counter 124 are scheduled to occur during inactive states of the new mode operation, and if so, disables hardware resets during those times.

Moreover, in different examples, the watchdog component 118 and the watchdog counter 124 may operate in either "polling" or an "interrupt" configuration. In the polling configuration, the watchdog component 118 resets the watchdog counter 124 at regular intervals that are shorter in time than the period necessary to count from the initial value to the final value. For example, a counter interval taking four minutes to count to the final value may have a polling feature in which the watchdog component 118 issues a counter reset every two minutes. Or, in the parlance of those skilled in the art, the watchdog component 118 "pats" the watchdog counter 124. Moreover, the watchdog component 118 may use a software timer managed by the operating system 110 to track the regular intervals for the watchdog counter 124 reset. This polling configuration requires the operating system 110 to be active, so it may drain power resources and therefore may not be suitable for all situations.

The interrupt configuration provides another way to keep resetting the watchdog counter 124, but in a manner that does not consume as much power as the polling configuration. In one example, the watchdog counter 124 periodically issues, within the period of a count interval, a request to the watchdog component 118 that causes the watchdog component 118—if the operating system 110 is functioning properly—to respond back with a counter reset of the watchdog counter 124 through the watchdog timer control logic 202. If the operating system 110 is hung up, no response is sent back to the watchdog counter 124, leaving the watchdog counter 124 to continue counting to the final value and consequently trigger a reset of the processor 106. In the parlance of those skilled in the art, the watchdog counter 124 "barks" so that the watchdog component 118 may "pat" it. If no pat occurs, the watchdog counter 124 "barks" at the final value to reset the processor 106.

In some examples, bark interrupts may be tracked by the watchdog component 118, and detected patterns of bark interrupts may be used to generate or define expiration times during which bites are scheduled to occur in inactive power states. For example, if the two previous bark interrupts occurred during low power-consuming states, the watchdog component 118 may disable the watchdog timer before the next cancellation time. In another example, if three of the previous five bark interrupts resulted in resetting of the watchdog counter 124, the next scheduled bite time will be determined to occur at an expiration time during an active power state, and therefore the watchdog component 118 will not disable the watchdog timer.

Figure 2B:
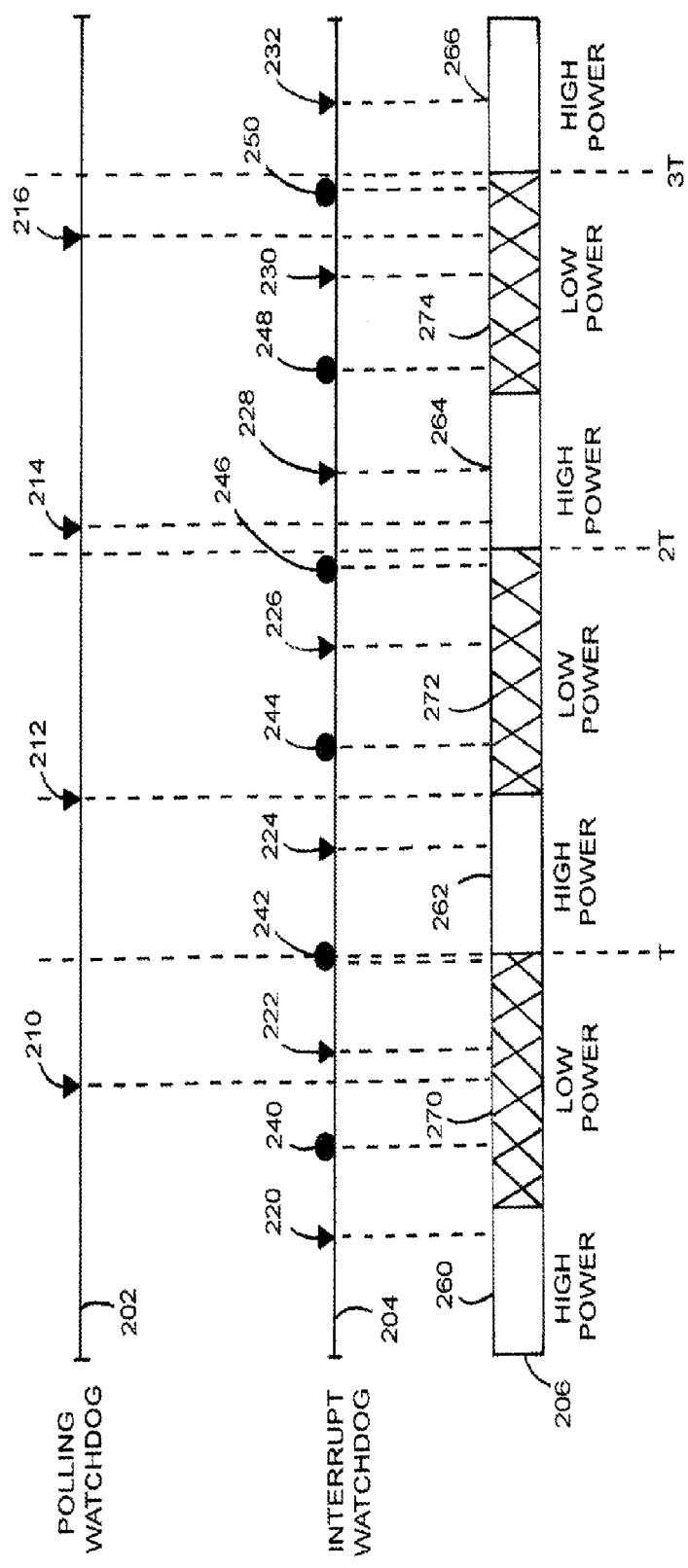
FIG. 2B is a timeline diagram of two watchdog timer configurations configured to selectively disable a processor.

To further illustrate some examples of this disclosure, FIG. 2B provides a timeline diagram of two watchdog timers, one functioning in a polling configuration and one functioning in an interrupt configuration, to selectively disable the processor 106. Three timelines are illustrated: timeline 202 illustrates the watchdog timer functioning in a polling configuration, timeline 204 illustrates the watchdog timer operating in an interrupt configuration, and timeline 206 illustrates the operating system 110 alternating timeframes of high power consumption and relatively low power of the operating system 118 for a given mode of operation. All three timelines are shown spanning three periods (T to 3 T) of the operating system timeline 206. The three timelines 202-206 are synchronized to illustrate various key points of the different watchdog timers. And the polling and interrupt watchdog timelines 202 and 204, respectively, illustrate various interaction times for the watchdog counter 124.

The operating system timeline 206 divides the scheduled times the operating system 110 is forecasted to be in a high power-consumption state (260, 262, 264, 266) and a low power-consumption state (270, 272, 274) into various timeframes. These timeframes are determined, in one example, by the scheduling component 122 based on the mode of operation detected by the mode detection component. In one example, the scheduling component predicts timeframes based on detected or scheduled modes of operation and the corresponding work schedule of the operating system 110 during such modes of operation. Again, as previously mentioned, the work schedule as mentioned herein in reference to operating system 110, is the scheduled breakdown of time the operating system 110 is expected to function in active and active states for a given mode of operation. For example, an audio playback mode may dictate that the operating system 110 cyclically be active for 4 ms and inactive for 10 ms, a video-conference mode may dictate that the operating system 110 cyclically be active for 10 ms and inactive for 2 ms, and so forth.

The polling watchdog timeline 202 illustrates various expiration times 210, 212, 214, and 216 of the watchdog timer 124. Expiration times 210, 212, 214, and 216 of the count interval are illustrated on the polling watchdog timeline 202. These expiration times represent the predicted times that the watchdog timer 124 will reach a final count value if the watchdog count interval is allowed to expire. When run in a polling configuration, examples count for a set interval, and the watchdog component 118 resets, or pats, the counter value of the watchdog counter 124. If no reset occurs by the expiration times 210, 212, 214, and 216, a hardware reset is scheduled to reset the processor 106.

Going a step further, if the scheduled hardware reset of the processor 106 is scheduled to occur during timeframes 270, 272, or 274 when the operating system 110 is in a low power-consuming state, one example disables or cancels all hardware resets of processor 106 at those expiration times. When the operating system transitions from an inactive timeframe to an active timeframe (i.e., wakes up), a real mode device driver ("WatchDog.sys") connects to an interrupt by calling an input/output interrupt connect routine ("IoConnectInterruptEx"). A watchdog interrupt service routine ("WDInterruptIsr") is specified for servicing hardware resets, and a device object is specified as the service context. To initiate a hardware reset, the watchdog interrupt service routine WDInterruptIsr is called with two parameters: an interrupt object and the service context. The device object is passed as the service context, and a reset variable ("WdReset") is provided as the interrupt object, causing the watchdog counter 124 to reset.

Expiration times 210, 212, and 216 are scheduled to occur during low power-consuming timeframes 270, 272, and 274. So the illustrated example does not issue any hardware resets of the processor 106 during these expiration times. For example, expiration time 214 is set to occur when the operating system 110 is forecast to be in a high power-consuming state timeframe 264, resulting in any hardware reset of the processor 106 at expiration time 214 to be carried out.

The interrupt watchdog timeline 204 shows scheduled bark functions 220, 222, 224, 226, 228, 230, and 232 and bite functions 240, 242, 244, 246, 248, and 250 of the watchdog counter 124. Bark functions 220, 222, 224, 226, 228, 230, and 232 refer to interrupt calls from the watchdog counter 124 to the watchdog component 118 requesting a counter reset. Bite functions 240, 242, 244, 246, 248, and 250 represent expiration times when the watchdog counter 124 is scheduled to reach the final value. In one example, the watchdog component predicts whether bite functions 240, 242, 244, 246, 248, and 250 are scheduled to occur during low power-consuming states. If so, hardware resets of the processor 106 scheduled during those low power-consuming states will be disabled or canceled. For example, bite functions 240, 242, 244, 246, 248, and 250 are all scheduled to occur during a low power-consuming state of the operating system 110. As a result, one example disables any corresponding hardware resets at those expiration times. Conversely, corresponding hardware resets for any of the bite functions scheduled to occur during a high power-consuming state would be allowed to proceed.

The previously discussed examples refer to just disabling or canceling hardware resets of the processor 106 when expiration times and bite functions (which are expiration times of the interrupt configuration) are scheduled to occur during low power-consuming states of the operating system 110. Additionally, some examples may also disable the watchdog counter 124 for an interval with an expiration time set to occur during low power-consuming states of the operating system 110. In these examples, disablement of the watchdog counter 124 may be performed during a time when the operating system 110 is in a high power-consuming state—e.g., in an active state. Otherwise, if the operating system 110 needs to be woken up from an inactive, low power-consuming state to cancel the watchdog counter 124, power would be wasted.

Figure 3:
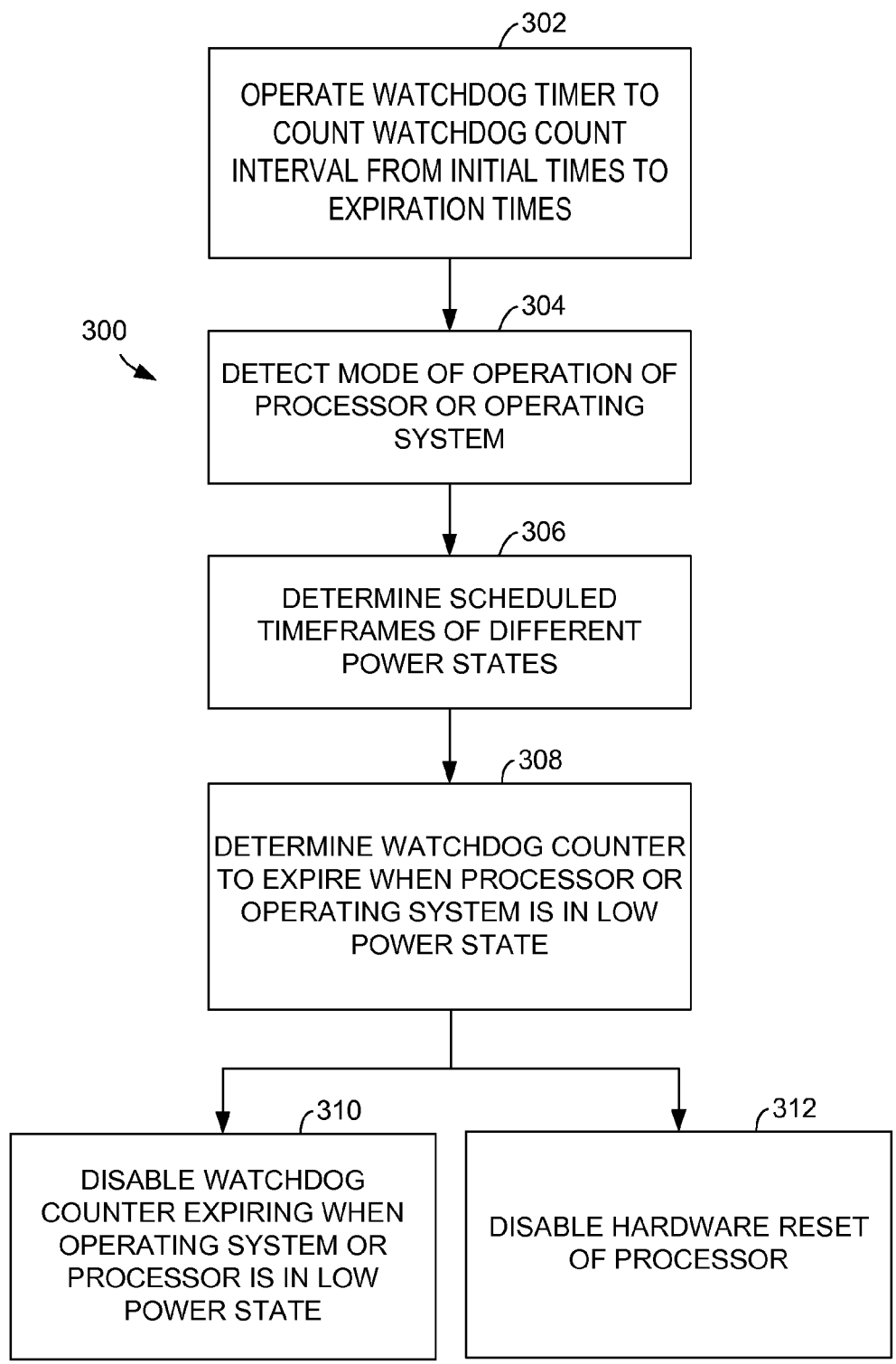
FIGS. 3-6 are flowchart diagrams for various work flows to manage a watchdog timer.

FIG. 3 is a flowchart diagram of a work flow 300 for managing a watchdog timer, according to one example. A watchdog timer counts a watchdog count interval from initial values at initial times to final values at expiration times, as shown at block 302. An operating system's or processor's mode of operation is detected, as shown in block 304. Based on the detected mode of operation, timeframes for when the operating system or processor are scheduled to be in different power states (e.g., high power-consuming state and low power-consuming state) are determined, as shown at block 306. Prospective watchdog counter expiration times are analyzed to determine when any are scheduled to occur at times when the processor or operating system is expected to be in a low power-consuming state, as shown at block 308. When the watchdog counter expires during timeframes of operating system or processor low power-consuming states, the watchdog counter is disabled, as shown at block 310. Any scheduled hardware resets of the processor are also disabled or canceled, as shown at block 312.

Figure 4:
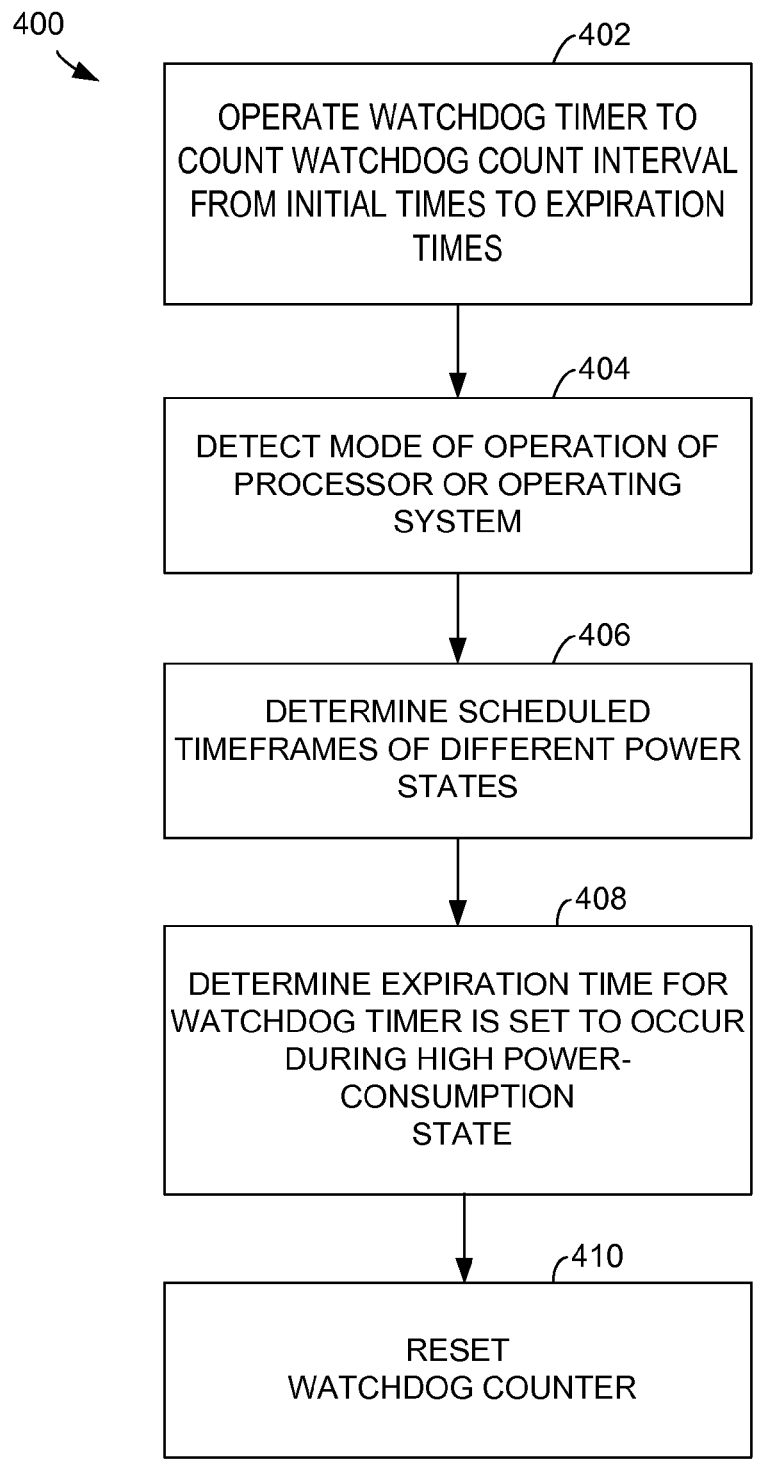

FIG. 4 is a flowchart diagram of a work flow 400 for managing a watchdog timer, according to one example. A watchdog timer counts a watchdog count interval from initial values at initial times to final values at expiration times, as shown at block 402. An operating system's or processor's mode of operation is detected, as shown in block 404. Based on the detected mode of operation, timeframes for when the operating system or processor are scheduled to be in different power states (e.g., high power-consuming state and low power-consuming state) are determined, as shown at block 406. Prospective watchdog counter expiration times are analyzed to determine when any are scheduled to occur at times when the processor or operating system is expected to be in a high power-consuming state, as shown at block 408. When the watchdog counter expires during timeframes of operating system or processor high power-consuming states, the watchdog counter is reset, as shown at block 410.

Figure 5:
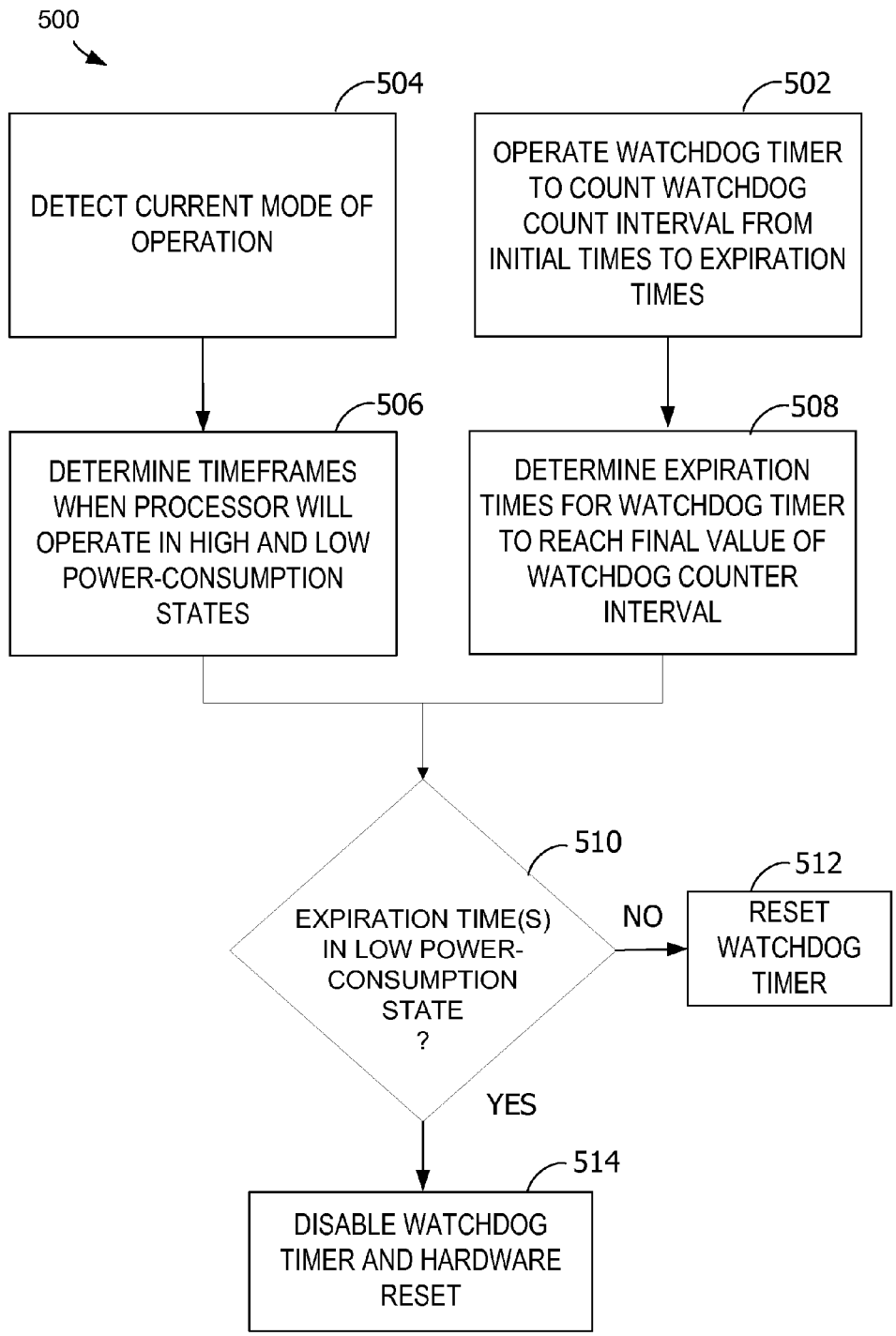

FIG. 5 is a flowchart diagram of a work flow 500 for managing a watchdog timer, according to one example. A watchdog timer counts a watchdog count interval from initial values at initial times to final values at expiration times, as shown at block 502. An operating system's or processor's mode of operation is detected, as shown in block 504. Based on the detected mode of operation, timeframes for when the operating system or processor are scheduled to be in different power states (e.g., high power-consuming state and low power-consuming state) are determined, as shown at block 506. Additionally, expiration times for when the watchdog counter is scheduled to reach a final value of a watchdog counter interval are determined, as shown at block 508. Prospective watchdog counter expiration times are analyzed to determine when any are scheduled to occur at times when the processor or operating system is expected to be in a low power-consuming state, as shown at decision block 510. If not, the watchdog timer is reset, as shown at block 512. If so, the watchdog counter is disabled and any respective hardware resets of the processor are disabled, as shown at block 514.

Figure 6:
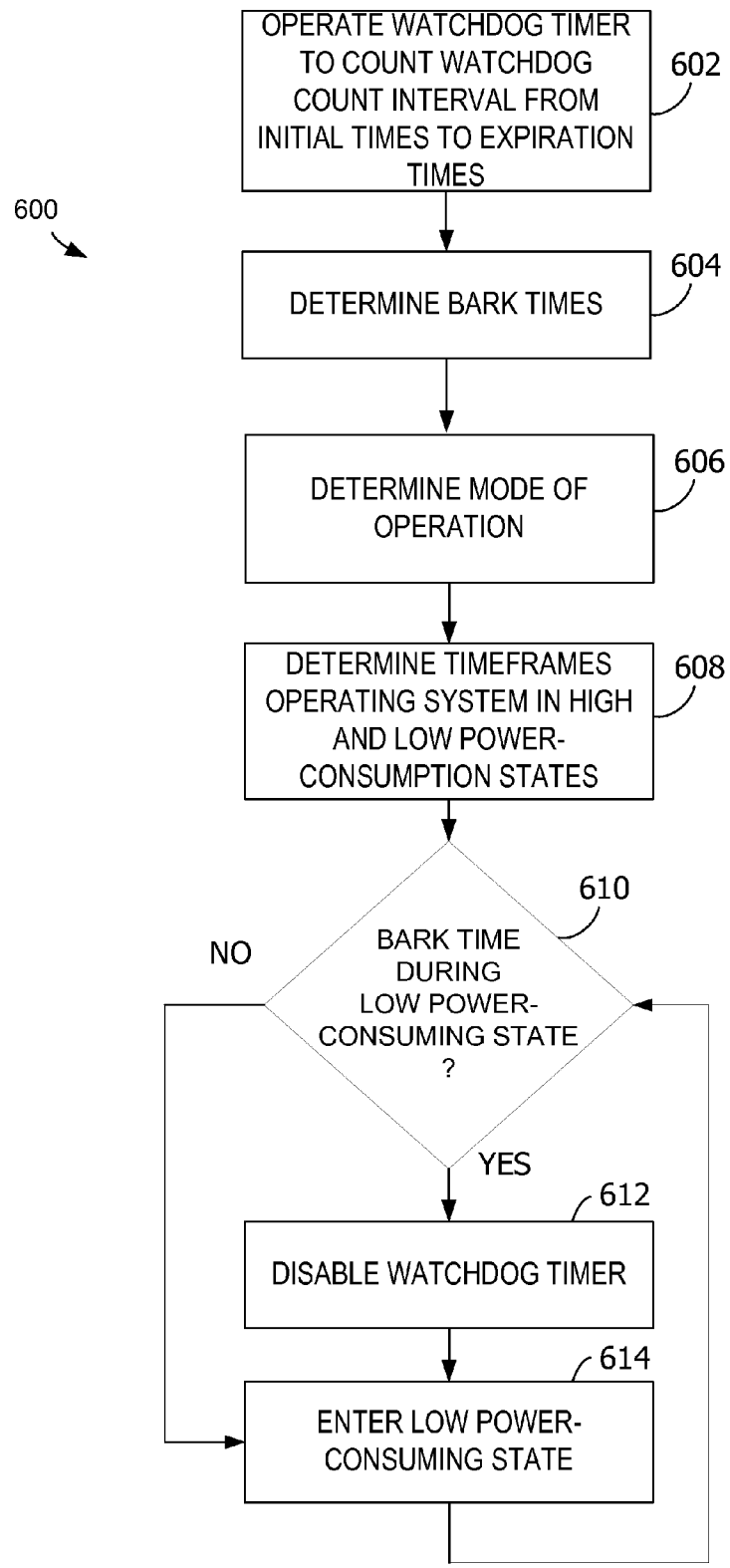

FIG. 6 is a flowchart diagram of a work flow 600 for managing a watchdog timer that operates in an interrupt configuration, according to one example. A watchdog timer counts a watchdog count interval from initial values at initial times to final values at expiration times, as shown at block 602. The watchdog timer, when operating in the interrupt configuration, periodically issues "bite" interrupts that request the watchdog counter to be reset and "bark" interrupts that, if allowed to be reached, trigger a processor reset. The watchdog timer determines the next bark time, as shown at block 604. Additionally, the mode of operation of the operating system or processor is also determined, as shown at block 606. Based on the determined mode of operation, watchdog component 118 determines the next timeframes that the operating system is in a high power-consuming state, as shown at block 608. Scheduled bark times (i.e., times watchdog counter 124 are scheduled to reach a final value) are compared to the next timeframes when the operating system is scheduled to be in a low power-consuming state, as shown at block 610.

As shown by the "Yes" decision path from block 610, bark times that are scheduled to occur when the operating system is set to function in the low power-consuming state cause the watchdog component 118 to disable the watchdog timer, as shown at block 612. The operating system is then allowed to enter the low power-consuming state, as shown at block 614. Thus, in one example, the watchdog timer is disabled while the operating system functions in the high power-consuming state, thereby avoiding a need to reawaken the operating system when it is inactive to carry out such disablement. This saves considerable power by eliminating a hardware reset when the processor is already inactive.

As shown by the "No" decision path from block 610, bark times that are scheduled to occur when the operating system is set to function in the high power-consuming state result in the watchdog timer being allowed to stay operational, without a watchdog timer disablement, while the operating system enters the low power-consuming state, as shown at block 614. Thus, in one example, the watchdog timer is kept operational when the operating system switches from the high power-consuming state to the low power-consuming state because the next scheduled bark interrupt is set to occur while the operating system is active. This ensures that the watchdog timer can still trigger device resets and clear device hang-ups.

Additional Examples

One example involves an apparatus with: a watchdog timer configured to count a watchdog count interval from an initial time to an expiration time; a memory area configured to store data that indicates the initial time and the expiration time; and a processing unit. The processing unit is programmed to execute an operating system, detect a current mode of operation for the operating system to operate in a high power-consuming state during a first timeframe and a low power-consuming state during a second timeframe, determine that the expiration time of the watchdog timer is set to occur during the second timeframe when the operating system will operate in the low power-consuming state, and disable the watchdog timer based upon the expiration time being set to occur when the operating system will operate in the low power-consuming state.

In another example, the watchdog timer comprises a hardware counter.

In another example, a watchdog component of the operating system is configured to disable the watchdog timer by disabling the hardware counter.

In another example, the processor is further programmed to analyze previous bark interrupts and disable the watchdog timer at a second expiration time based on the previous bark interrupts.

In another example, a watchdog component of the operating system is configured to disable the watchdog timer before the second timeframe begins.

In another example, the operating system is set to operate in the low power-consuming state comprises an operating system operating in an idle or off state.

In another example, the watchdog timer, the memory area, and the processing unit are housed in at least one member of a group comprising a smart phone, a tablet, a computer, a gaming console, and a server.

In another example, the processing unit is configured to determine the current mode of operation dictates the operating system is set to additionally operate in the high power-consuming state during a third timeframe, and determine a second expiration time of the watchdog timer being set to occur in the third timeframe when the operating system will operate in the high power-consuming state, and reset the watchdog timer at the second expiration time during the third timeframe.

In another example, the processing unit comprises at least one of a field-programmable Gate Array, an Application-specific Integrated Circuit, a System-on-a-chip system, and a Complex Programmable Logic Device.

Another example involves a method for operating a watchdog timer for a computing device, the watchdog timer counting a watchdog count interval from an initial time to an expiration time The method comprises: detecting a current mode of operation of the computing device that requires a processing unit to function in a high power-consuming state and a low power-consuming state; determining the expiration time of the watchdog timer is set to occur while the processing unit is scheduled to function in the low power-consuming state; and disabling the watchdog timer when the expiration time is forecast to occur while the processing unit is scheduled to function in the low power-consuming state.

In another example, bark interrupts are analyzed, and the watchdog timer is disabled at a second expiration time based on the analyzed bark interrupts.

In another example, disabling of the watchdog timer occurs before the processing unit functions in the low power-consuming state.

In another example, the method further comprises: determining a second expiration time of the watchdog timer is set to occur while the processing unit is scheduled to function in the high power-consuming state; and resetting the watchdog timer when the expiration time is forecast to occur while the processing unit is scheduled to function in the low power-consuming state.

In another example, the current mode of operation comprises at least one member of a group comprising an audio playback mode, a video playback mode, a video record mode, a video-conference mode, a connected standby mode, a camera mode, a web browser mode, and a typing mode.

In another example, the computing device comprises at least one member of a group comprising a smart phone, a tablet, a computer, a gaming console, and a server.

Another example involves computer-storage media embodying computer-executable components on a computing device, having at least one processor, for managing a watchdog timer configured to count a watchdog count interval from an initial value to a final value. The components comprise: a mode detection component that when executed causes the at least one processor to detect a current mode of operation of the computing device; a scheduling component that when executed causes the at least one processor to determine when the mode of operation dictates the at least one processor will function in different power states and when the watchdog timer will finish counting the watchdog count interval; and a watchdog component that when executed causes the at least one processor to selectively disable or reset the watchdog timer based on which of the power states in which the at least one processor is scheduled to function at the time the watchdog timer will finish counting the watchdog count interval.

In one example, the watchdog component is configured to: reset the watchdog timer to an initial count value when the watchdog count interval is determined to expire while the at least one processor is scheduled to function in a higher state of power consumption, and disable the watchdog timer to the when the watchdog count interval is determined to expire while the at least one processor is scheduled to function in a lower state of power consumption.

While the aspects of the disclosure have been described in terms of various examples with their associated operations, a person skilled in the art would appreciate that a combination of operations from any number of different examples is also within scope of the aspects of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition, the functionality described herein may be performed, at least in part, by one or more hardware logic components. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

At least a portion of the functionality of the various elements in the figures may be performed by other elements in the figures, or an entity (e.g., processor, web service, server, application program, computing device, etc.) not shown in the figures.

The examples illustrated and described herein as well as examples not specifically described herein but within the scope of aspects of the disclosure constitute exemplary means for operating a watchdog timer for a computing device. For example, the elements illustrated in FIG. 1A, FIG. 1B, FIG. 1C, FIG. 2A, and/or FIG. 2B, such as when encoded to perform the operations illustrated in FIG. 3, FIG. 4, and/or FIG. 5, constitute exemplary means for detecting a current mode of operation of the computing device that requires a processing unit to function in a high power-consuming state and a low power-consuming state, exemplary means for determining the expiration time of the watchdog timer is set to occur while the processing unit is scheduled to function in the low power-consuming state, and exemplary means for disabling the watchdog timer when the expiration time is forecast to occur while the processing unit is scheduled to function in the low power-consuming state.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An apparatus, comprising:
    a watchdog timer configured to count a watchdog count interval from an initial time to an expiration time;
    a memory area configured to store data that indicates the initial time and the expiration time; and
    a processor programmed to:
        execute an operating system,
        detect a current mode of operation for the operating system to operate in a high power-consuming state during a first timeframe and a low power-consuming state during a second timeframe,
        determine that the expiration time of the watchdog timer is set to occur during the second timeframe when the operating system will operate in the low power-consuming state, and
        disable the watchdog timer based upon the expiration time being set to occur when the operating system will operate in the low power-consuming state.

2. The apparatus of claim 1, wherein the watchdog timer comprises a hardware counter.

3. The apparatus of claim 2, wherein a watchdog component of the operating system is configured to disable the watchdog timer by disabling the hardware counter.

4. The apparatus of claim 1, wherein the processor is further programmed to:
    analyze bark interrupts, wherein a bark interrupt is a response to a request issued by the watchdog timer that causes the watchdog timer to reset; and
    disable the watchdog timer at a second expiration time based on the analyzed bark interrupts.

5. The apparatus of claim 1, wherein a watchdog component of the operating system is configured to disable the watchdog timer before the second timeframe begins.

6. The apparatus of claim 1, wherein the operating system is set to operate in the low power-consuming state comprises an operating system operating in an idle or off state.

7. The apparatus of claim 1, wherein the watchdog timer, the memory area, and the processor are housed in at least one member of a group comprising a smart phone, a tablet, a computer, a gaming console, and a server.

8. The apparatus of claim 1, wherein the processor is configured to:
    determine that the current mode of operation dictates the operating system is set to additionally operate in the high power-consuming state during a third timeframe,
    determine a second expiration time of the watchdog timer being set to occur in the third timeframe when the operating system will operate in the high power-consuming state, and
    reset the watchdog timer at the second expiration time during the third timeframe.

9. The apparatus of claim 1, wherein the processor comprises at least one member of a group comprising a field-programmable gate array, an application-specific integrated circuit, a system-on-a-chip system, and a complex programmable logic device.

10. A method for operating a watchdog timer for a computing device, the watchdog timer counting a watchdog count interval from an initial time to an expiration time, the method comprising:
    detecting a current mode of operation of the computing device that requires a processor to function in a high power-consuming state and a low power-consuming state;
    determining the expiration time of the watchdog timer is set to occur while the processor is scheduled to function in the low power-consuming state; and
    disabling the watchdog timer when the expiration time is forecast to occur while the processor is scheduled to function in the low power-consuming state.

11. The method of claim 10, wherein the watchdog timer comprises a hardware counter.

12. The method of claim 10, further comprising:
    analyzing bark interrupts, wherein a bark interrupt is a response to a request issued by the watchdog timer that causes the watchdog timer to reset; and
    disabling the watchdog timer at a second expiration time based on the analyzed bark interrupts.

13. The method of claim 10, wherein said disabling of the watchdog timer occurs before the processor functions in the low power-consuming state.

14. The method of claim 10, wherein the watchdog counter comprises one or more hardware counters.

15. The method of claim 10, further comprising:
    determining a second expiration time of the watchdog timer is set to occur while the processor is scheduled to function in the high power-consuming state; and
    resetting the watchdog timer when the expiration time is forecast to occur while the processor is scheduled to function in the low power-consuming state.

16. The method of claim 10, wherein the current mode of operation comprises at least one member of a group comprising an audio playback mode, a video playback mode, a video record mode, a video-conference mode, a connected standby mode, a camera mode, a web browser mode, and a typing mode.

17. The method of claim 10, wherein the computing device comprises at least one member of a group comprising a smart phone, a tablet, a computer, a gaming console, and a server.

18. One or more computer-storage media embodying computer-executable components on a computing device, having at least one processor, for managing a watchdog timer configured to count a watchdog count interval from an initial value to a final value, said components comprising:
    a mode detection component that when executed causes the at least one processor to detect a current mode of operation of the computing device;
    a scheduling component that when executed causes the at least one processor to determine when the mode of operation dictates the at least one processor will function in different power states and when the watchdog timer will finish counting the watchdog count interval; and
    a watchdog component that when executed causes the at least one processor to selectively disable or reset the watchdog timer based on which of the power states in which the at least one processor is scheduled to function at the time the watchdog timer will finish counting the watchdog count interval.

19. The computer-storage media of claim 18, wherein the watchdog component is configured to:
- reset the watchdog timer to an initial count value when the watchdog count interval is determined to expire while the at least one processor is scheduled to function in a higher state of power consumption, and
- disable the watchdog timer to the when the watchdog count interval is determined to expire while the at least one processor is scheduled to function in a lower state of power consumption.

20. The computer-storage media of claim 18, wherein the watchdog counter comprises a hardware counter.

\* \* \* \* \*